United States Patent
Peng et al.

(10) Patent No.: US 11,917,278 B2
(45) Date of Patent: Feb. 27, 2024

(54) CAMERA MODULE OF REDUCED SIZE AND METHOD FOR MANUFACTURING THE SAME

(71) Applicants: HongQiSheng Precision Electronics (QinHuangDao) Co., Ltd., Qinhuangdao (CN); Avary Holding (Shenzhen) Co., Limited., Shenzhen (CN)

(72) Inventors: Man-Zhi Peng, Huaian (CN); Rui-Wu Liu, Huaian (CN); Jia-He Li, Shenzhen (CN)

(73) Assignees: HongQiSheng Precision Electronics (QinHuangDao) Co., Ltd., Qinhuangdao (CN); Avary Holding (Shenzhen) Co., Limited., Shenzhen (CN)

(*) Notice: Subject to any disclaimer, the term of this patent is extended or adjusted under 35 U.S.C. 154(b) by 137 days.

(21) Appl. No.: 17/717,334

(22) Filed: Apr. 11, 2022

(65) Prior Publication Data
US 2022/0232152 A1     Jul. 21, 2022

Related U.S. Application Data

(63) Continuation-in-part of application No. PCT/CN2020/097798, filed on Jun. 23, 2020.

(51) Int. Cl.
*H04N 23/55* (2023.01)
*H04N 23/54* (2023.01)

(52) U.S. Cl.
CPC ............ *H04N 23/55* (2023.01); *H04N 23/54* (2023.01)

(58) Field of Classification Search
CPC ........ H04N 23/55; H04N 23/54; Y02P 70/50; G02B 7/04
USPC ............................... 348/294–324; 250/208.1
See application file for complete search history.

(56) References Cited

U.S. PATENT DOCUMENTS

2018/0352127 A1* 12/2018 Wang ..................... H04N 23/54
2019/0320096 A1* 10/2019 Chen ...................... H04N 23/54

FOREIGN PATENT DOCUMENTS

CN          208654409 U       3/2019
CN          109756659 A       5/2019

* cited by examiner

*Primary Examiner* — Yogesh K Aggarwal
(74) *Attorney, Agent, or Firm* — ScienBiziP, P.C.

(57) ABSTRACT

A camera module of reduced size includes a baseplate, an image sensor on the baseplate, a mounting bracket with a through hole, and a circuit board. An inner wall of the through hole extends towards a central axis of the through hole to form a platform, a side of the mounting bracket adjacent to the platform extends outward to form a connecting portion. A multilayer coil, a capacitor, and a resistor are formed on the mounting bracket by laser direct structuring, the multilayer coil is of encircling coils arranged from inside to outside on the mounting bracket and surrounds the through hole. The circuit board is connected with the mounting bracket through the connecting portion. A method for manufacturing a lens module is also disclosed.

16 Claims, 8 Drawing Sheets

CAMERA MODULE OF REDUCED SIZE AND METHOD FOR MANUFACTURING THE SAME

FIELD

The present disclosure relates to a camera module and a manufacturing method thereof.

BACKGROUND

Electronic products are often equipped with a camera module, but in order to realize the miniaturization of the electronic product, the camera should also be miniaturized.

BRIEF DESCRIPTION OF THE DRAWINGS

The following drawn figures are to be viewed in conjunction with the embodiments described herein.

DETAILED DESCRIPTION

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. When a first component is referred to as "disposed to" a second component, it is intended that the first component may be directly disposed to the second component or may be disposed to the second component via a third component between them. The terms "perpendicular," "horizontal," "left," "right," and similar expressions used herein are merely intended for description.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The term "and/or" used herein includes any suitable combination of one or more related items listed.

The present disclosure provides a lens module. The lens module includes a baseplate defining a receiving hole, an image sensor disposed on the baseplate and corresponding in position to the receiving hole, a mounting bracket disposed on the baseplate, an optical filter, a lens, and a circuit board. The mounting bracket defines a through hole. An inner wall of the through hole extends towards a central axis of the through hole to form a platform, and a side of the mounting bracket adjacent to the platform extends outward to form a connecting portion. A multilayer coil surrounding the through hole, a capacitor, and a resistor are formed on the mounting bracket by laser direct structuring (LDS). The multilayer coil is constituted by multiple layers of encircling coils which surround the through hole and are formed on the mounting bracket by winding from inside to outside. The number of layers in the multilayer coil is greater than 2. Layers in the multilayer coil are electrically connected with each other through via holes. The image sensor is disposed on the platform and is accommodated in the through hole. The lens is mounted in the through hole. The circuit board is connected with the mounting bracket through the connecting portion.

The present disclosure also provides a method for manufacturing the lens module. The method includes the following steps. The image sensor is mounted on the baseplate, the image sensor corresponding in position to the receiving hole on the baseplate. The mounting bracket is provided, the mounting bracket defining the through hole, the inner wall of the through hole extending towards a central axis of the through hole to form the platform, and the side of the mounting bracket adjacent to the platform extending outward to form the connecting portion. The multilayer coil surrounding the through hole, the capacitor, and the resistor are formed by laser direct structuring, the multilayer coil being constituted by multiple layers of encircling coils surrounding the through hole and formed on the mounting bracket wound from inside to outside, and the number of layers in the multilayer coil being greater than 2. The layers in the multilayer coil are electrically connected with each other through via holes. The optical filter is mounted on the platform, the optical filter being accommodated in the through hole. The lens is mounted in the through hole. The mounting bracket is mounted on the baseplate. The circuit board is connected with the mounting bracket through the connecting portion.

In the lens module and the manufacturing method of the present disclosure, the mounting bracket extends outward to form the connecting portion, and the circuit board is connected with the mounting bracket through the connecting portion, thus a height of the circuit board is reduced and a thickness of the lens module is also reduced. In addition, the multilayer coil surrounding the through hole is formed on the mounting bracket from inside to outside by laser direct structuring, the capacitor and the resistor are formed on the mounting bracket by laser direct structuring, and layers in the multilayer coil are electrically connected to each other through via holes. This achieves maximum use of line space on the mounting bracket, so as to reduce the size of the mounting bracket.

Referring to FIGS. 1 to 7, an embodiment of a lens module 100 is provided. The lens module 100 is applied to an electronic device (not shown) which may be a smart phone, a tablet computer, etc. The lens module 100 includes a baseplate 10, an image sensor 20, a mounting bracket 30, an optical filter 40, a lens 50, and a circuit board 60.

Figure 1:
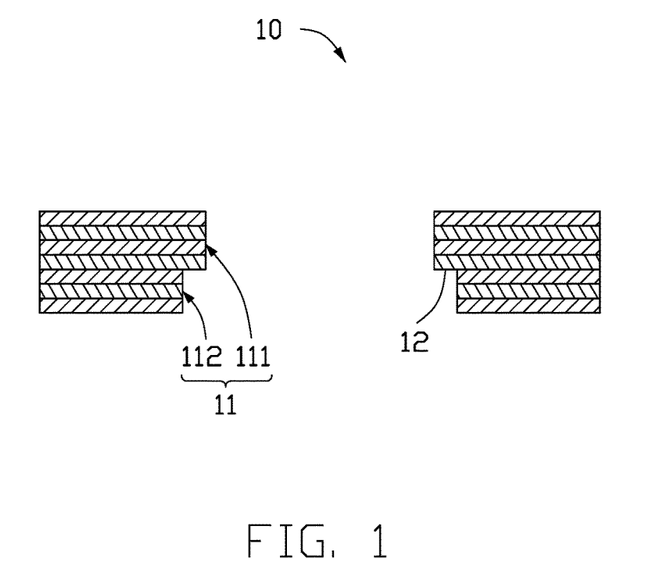
FIG. 1 is a cross-sectional view of a baseplate according to an embodiment of the present disclosure.
Figure 2:
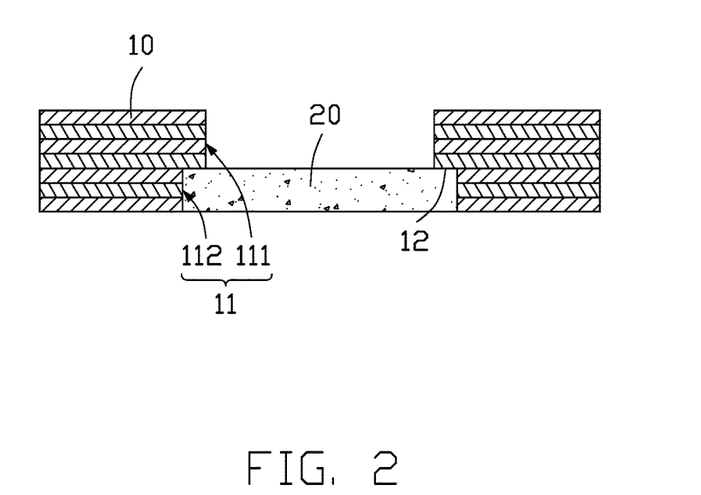
FIG. 2 is a cross-sectional view showing an image sensor disposed on the baseplate of FIG. 1.

The baseplate 10 defines a receiving hole 11 penetrating the baseplate 10. The image sensor 20 is mounted on the baseplate 10 by flip-chip bonding, and the image sensor 20 corresponds in position to the receiving hole 11. The baseplate 10 may be a ceramic plate or a hard board.

The receiving hole 11 is a step-shaped hole. The receiving hole 11 includes a first receiving hole 111 and a second receiving hole 112 intercommunicating. A width of the first receiving hole 111 is less than a width of the second receiving hole 112, to form a flange 12 on the baseplate 10.

The image sensor 20 is mounted on the flange 12 by flip-chip bonding. The width of the first receiving hole 111 is less than a width of the image sensor 20 and the width of the image sensor 20 is less than or equal to the width of the second receiving hole 112.

A depth of the second receiving hole 112 is less than or equal to a thickness of the image sensor 20, so that the image sensor 20 is accommodated in the receiving hole 11. The image sensor 20 is a complementary metal oxide semiconductor (CMOS) chip or a charge-coupled device (CCD) chip.

Figure 3:
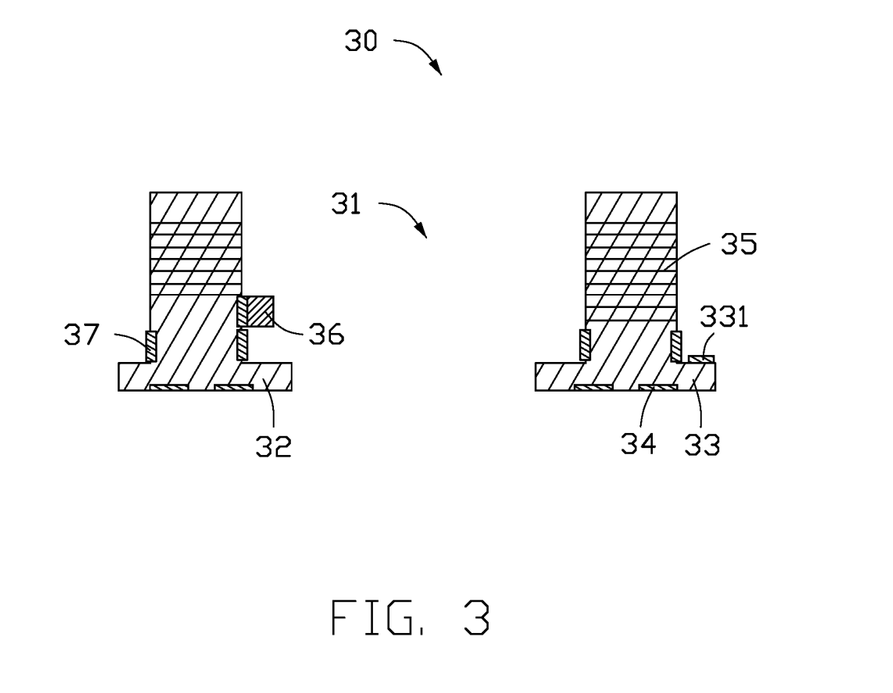
FIG. 3 is a cross-sectional view showing a mounting bracket according to an embodiment of the present disclosure.
Figure 4:
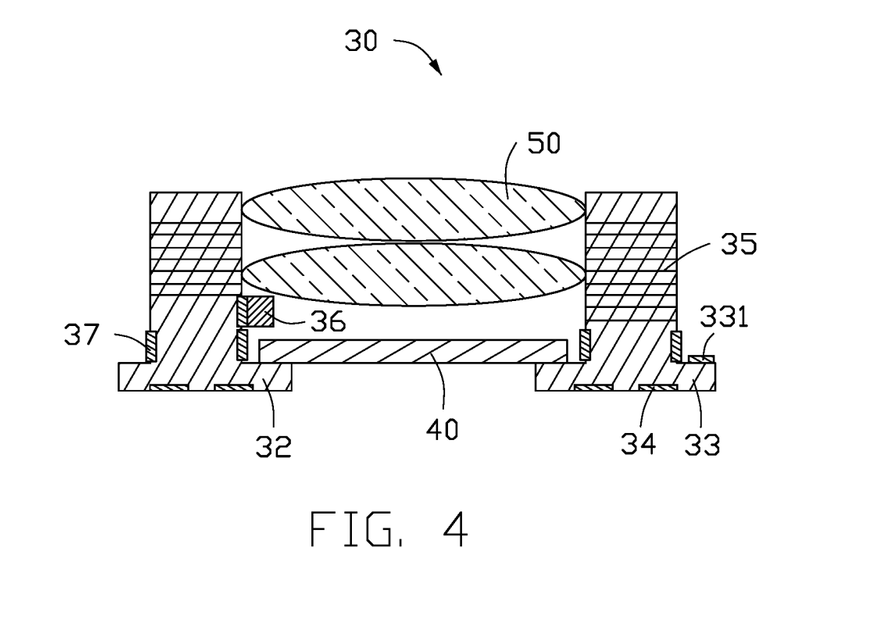
FIG. 4 is a cross-sectional view showing an optical filter and a lens disposed on the mounting bracket of FIG. 3.

The mounting bracket 30 is fixed to the baseplate 10. The mounting bracket 30 defines a through hole 31 penetrating the mounting bracket 30. The through hole 31 corresponds in position to the receiving hole 11. A part of an inner wall of the through hole 31 close to the baseplate 10 extends towards a central axis of the through hole 31 to form a platform 32. The optical filter 40 is fixed to the platform 32 by an adhesive layer and is accommodated in the through hole 31. In the present embodiment, a surface of the platform 32 is a surface of the mounting bracket 30 in contact with the baseplate 10. The platform 32 may also be arranged in a structure similar to the flange 12 on the baseplate 10.

A side of the mounting bracket 30 close to the baseplate 10 extends outward to form a connecting portion 33. The connecting portion 33 is provided with a solder pad 331 for connecting with the circuit board 60 or other components.

A surface of the mounting bracket 30 close to the baseplate 10 is provided with a bonding pad 34 for connecting the baseplate 10 or other components.

In some embodiments, the mounting bracket 30 is connected with the baseplate 10 through a surface mounted technology (SMT) or an anisotropic conductive film (ACF).

The mounting bracket 30 is also provided with a coil 35, a capacitor 36, and a resistor 37, around the through hole 31.

Specifically, the mounting bracket 30 is formed by laser direct structuring (LDS). The coil 35, the capacitor 36, and the resistor 37 are directly formed on the mounting bracket 30 by LDS.

The LDS process is a three-dimensional molded interconnect device (3D-MID) production technology including injection molding, laser processing, and electroplating process. By LDS, ordinary plastic components are endowed with electrical interconnection function, so that plastic shells and structural parts not only have the functions of support and protection, but also have the functions of shielding and an antenna combined with conductive circuits, thereby forming the so-called 3D-MID, which is suitable for the production of thin local lines.

Figure 8:
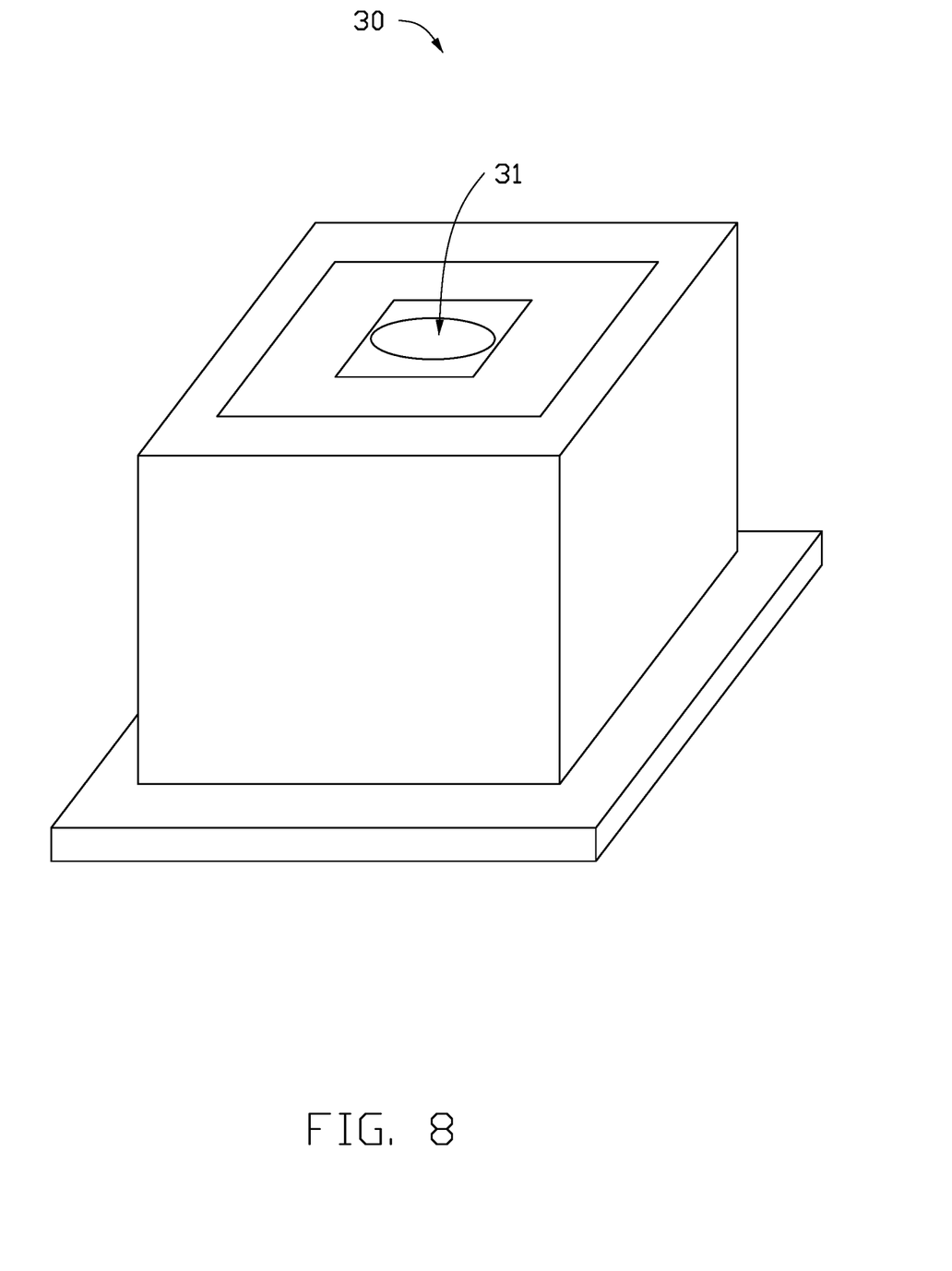
FIG. 8 is a perspective view of the mounting bracket according to an embodiment of the present disclosure.
Figure 9:
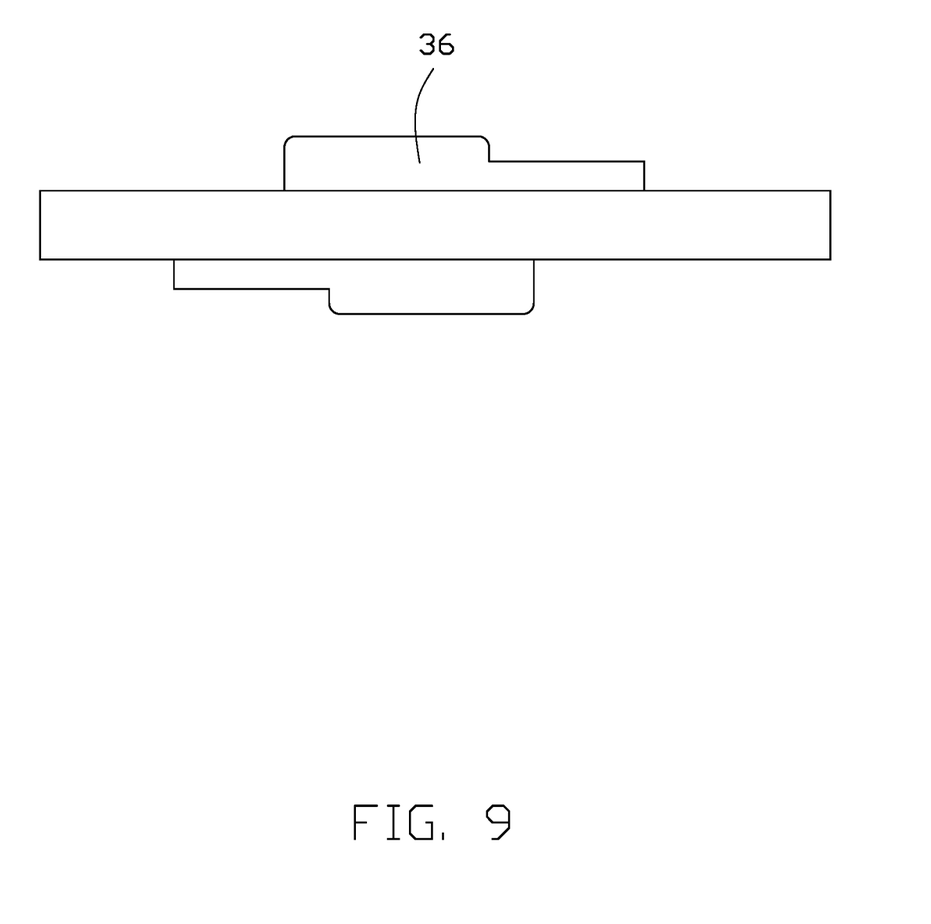
FIG. 9 is a diagram of a capacitor of the mounting bracket of FIG. 8.
Figure 10:
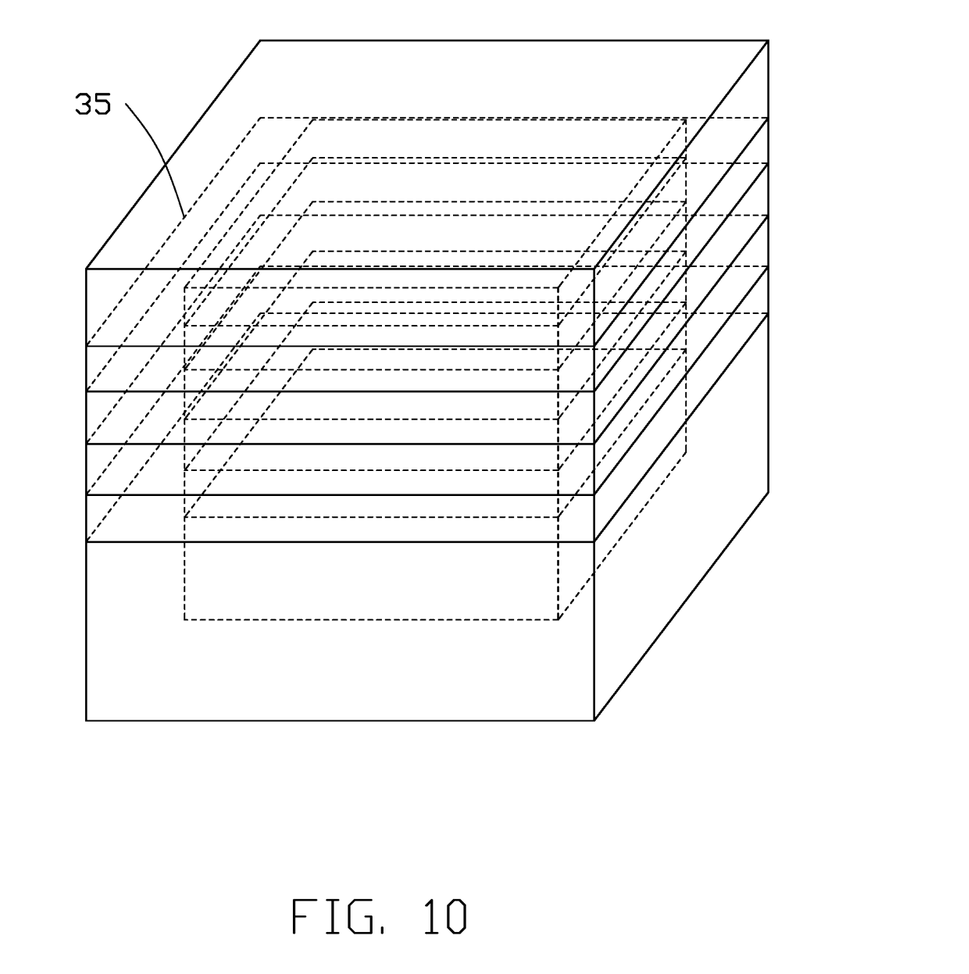
FIG. 10 is a diagram of coils of the mounting bracket of FIG. 8.

Referring to FIGS. 8 to 10, the mounting bracket 30 is made in multiple layers (more than two layers) by LDS, and a plurality of layers of encircling coils are formed on the mounting bracket 30 from inside to outside by the LDS process to form the coil 35. Specifically, one part is formed by injection molding, then one layer of encircling coil is formed on the outer surface of the injection-molded part through laser cutting and electroplating, then another part is formed on the one injection-molded part, and another layer of encircling coil connected with the one layer of encircling coil is formed on the outer surface of the other injection-molded part, so that the coil 35 can be directly formed in the mounting bracket 30. The number of layers of the coil 35 is greater than 2, and the layers in the multilayer coil 35 are electrically connected by via holes (not shown). The capacitor 36 is formed on the inner wall of the through hole 31. According to requirements, the resistor 37 which controls current, such as a single-layer resistor or a multi-layer resistor, is formed at a local position of the mounting bracket 30.

The optical filter 40 may be an infrared filter. The infrared filter is formed by plating optical films having a high refractive index on an optical substrate using a precision optical coating technology, the filter removes infrared light from incoming light.

The lens 50 is mounted in the through hole 31 of the mounting bracket 30. The lens 50 corresponds in position to the image sensor 20. The lens 50 may be made of resin.

Figure 5:
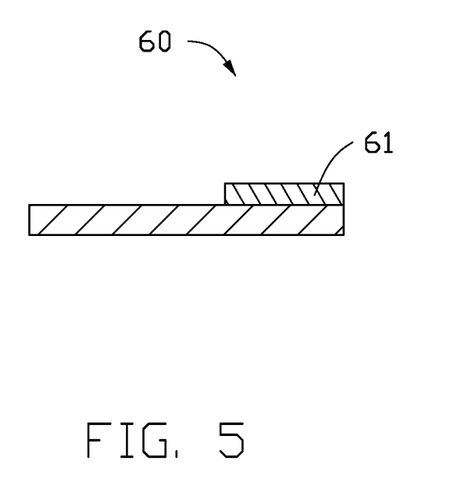
FIG. 5 is a cross-sectional view showing a circuit board according to an embodiment of the present disclosure.
Figure 7:
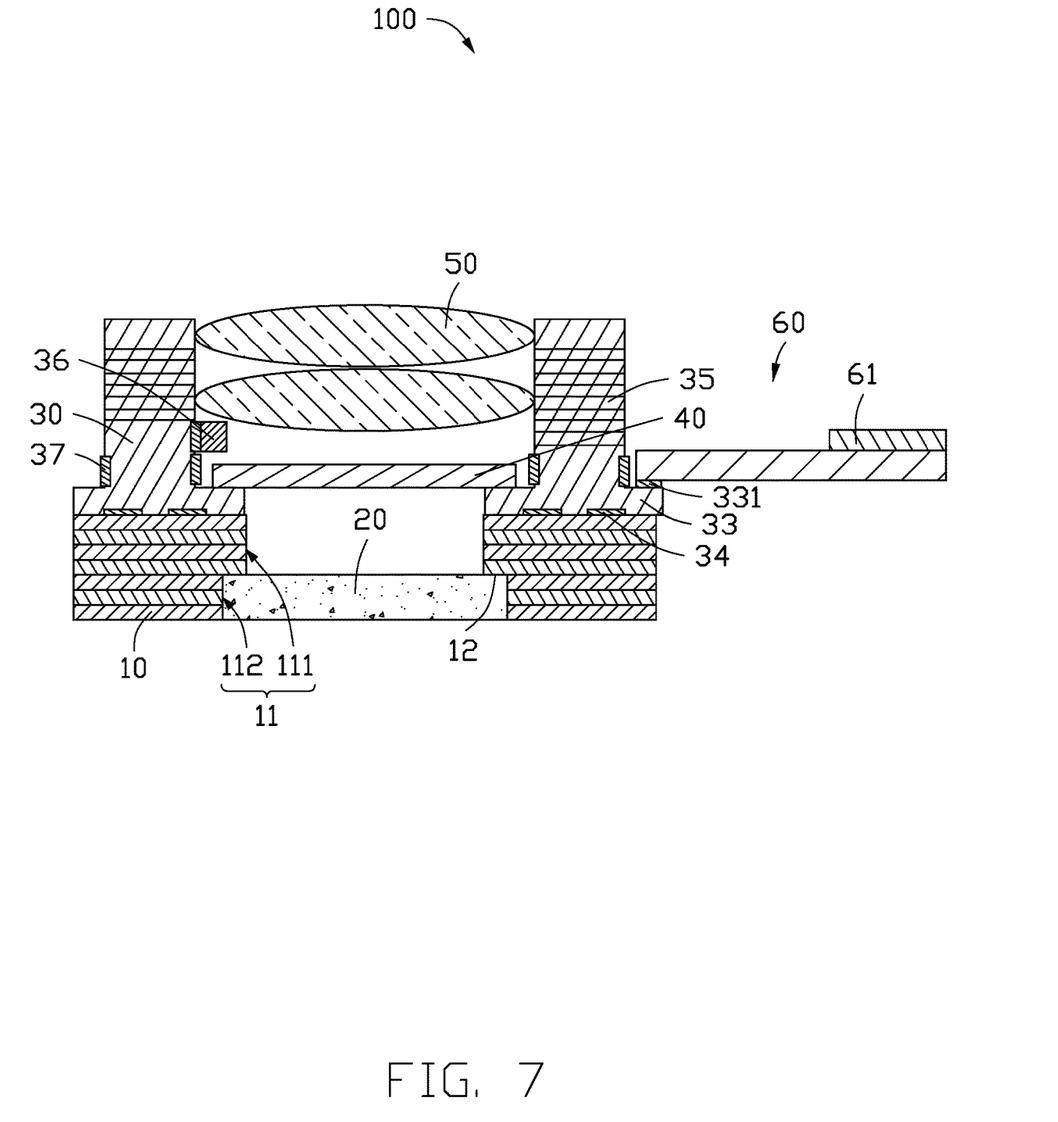
FIG. 7 is a cross-sectional view showing the circuit board of FIG. 5 connected with the mounting bracket of FIG. 6.

The circuit board 60 is connected with the mounting bracket 30 through the connecting portion 33. The circuit board 60 may be a ceramic board, a soft board, a hard board, or a rigid-flexible board.

The circuit board 60 may be connected with the connecting portion 33 through an anisotropic conductive film (ACF), hot bar soldering, paste soldering, or the surface mounted technology (SMT), thereby reducing a height of the entire lens module 100.

The circuit board 60 is provided with a connector 61. The connector 61 is attached to a surface of the circuit board 60 through the surface mounted technology (SMT).

Figure 11:
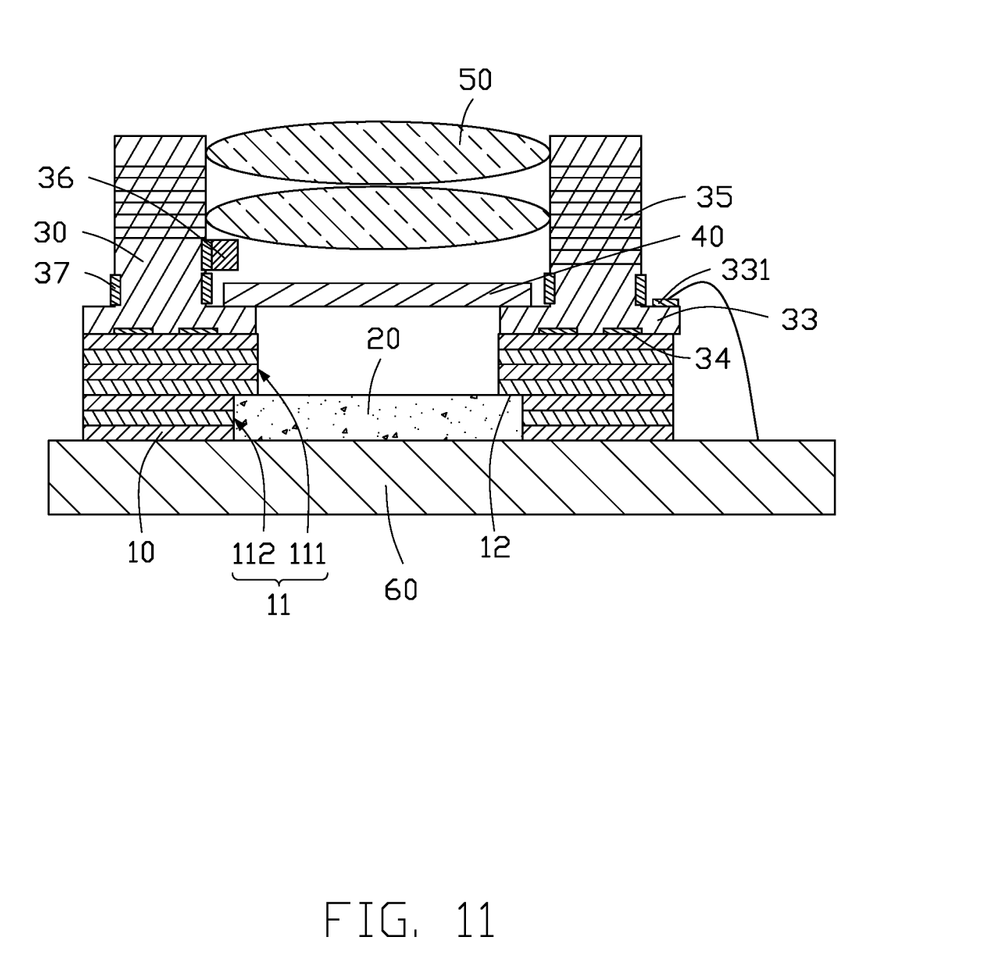
FIG. 11 is a cross-sectional view showing the circuit board connected with the mounting bracket according to another embodiment of the present disclosure.

Referring to FIG. 11, the baseplate 10, the image sensor 20, the mounting bracket 30, the optical filter 40, and the lens 50 can also be used as an independent component, and the circuit board 60 or other component can be connected with the connecting portion 33 by wire bonding.

An embodiment of a method for manufacturing the lens module 100 includes the following steps:

Step one, referring to FIG. 1, the baseplate 10 is provided. Specifically, the baseplate 10 defines the receiving hole 11 penetrating the baseplate 10. The receiving hole 11 is a step-shaped hole. The receiving hole 11 includes the first receiving hole 111 and the second receiving hole 112 which intercommunicate. A width of the first receiving hole 111 is less than a width of the second receiving hole 112 to form the flange 12 on the baseplate 10.

Step two, referring to FIG. 2, the image sensor 20 is provided and is mounted on the baseplate 10 by flip chip bonding.

Specifically, the width of the first receiving hole 111 is less than the width of the image sensor 20, the width of the image sensor 20 is less than or equal to the width of the second receiving hole 112, and a depth of the second receiving hole 112 is less than or equal to a thickness of the image sensor 20. When the image sensor 20 is mounted on the flange 12 by flip chip bonding, the image sensor 20 is accommodated in the receiving hole 11.

Step three, referring to FIG. 3, the mounting bracket 30 is provided.

Specifically, the mounting bracket 30 with the coil 35, the capacitor 36, and the resistor 37 is formed through a LDS process.

The mounting bracket 30 defines the through hole 31 penetrating the mounting bracket 30. A part of the inner wall on a side of the mounting bracket 30 extends towards the central axis of the through hole 31 to form the platform 32. A side of the mounting bracket 30 close to the baseplate 10 extends outward to form the connecting portion 33. The connecting portion 33 is provided with the solder pad 331 for connecting with the circuit board 60 or other components. A surface of the mounting bracket 30 close to the baseplate 10 is provided with the bonding pad 34 for connecting the baseplate 10 or other components.

The coil 35 is constituted by the plurality of layers of encircling coils formed on the mounting bracket 30 from inside to outside, surrounding the through hole 31. The capacitor 36 is formed on the inner wall of the through hole 31. The resistor 37 is formed at a local position of the mounting bracket 30 according to need.

Step four, referring to FIG. 4, the optical filter 40 and the lens 50 are provided and are mounted on the mounting bracket 30.

Specifically, the optical filter 40 is fixed to the platform 32 by an adhesive layer and is accommodated in the through hole 31. The lens 50 is mounted in the through hole 31 of the mounting bracket 30.

Step five, referring to FIG. 5, the circuit board 60 is provided.

The connector 61 is attached to a surface of the circuit board 60 through the surface mounted technology (SMT).

Figure 6:
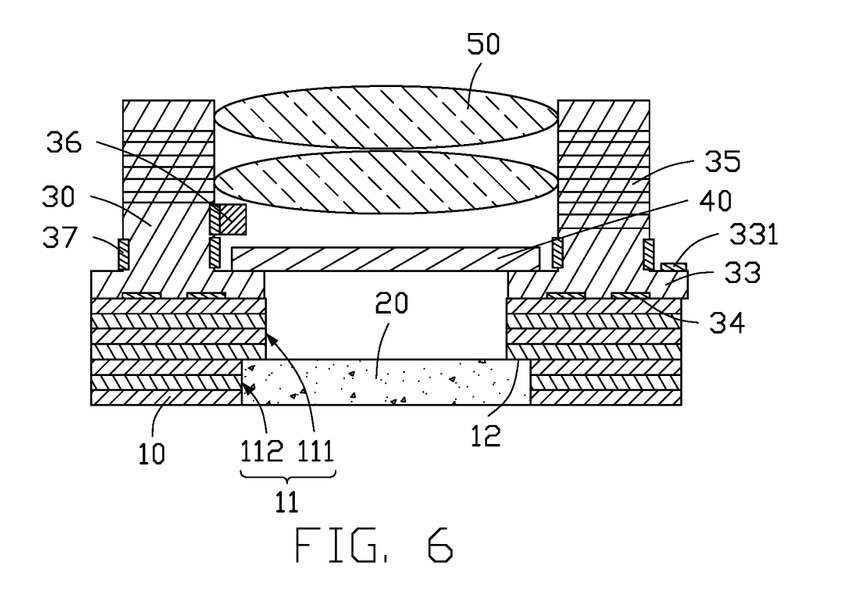
FIG. 6 is a cross-sectional view showing the mounting bracket of FIG. 4 connected with the baseplate of FIG. 2.

Step six, referring to FIG. 6, the mounting bracket 30 is mounted on the baseplate 10.

Specifically, the bonding pad 34 of the mounting bracket 30 is connected with the baseplate 10 through the surface mounted technology (SMT) or an anisotropic conductive film (ACF).

Step seven, referring to FIG. 7, the circuit board 60 is connected with the mounting bracket 30.

Specifically, the solder pad 331 of the connecting portion 33 of the mounting bracket 30 is connected with the circuit board 60 through an anisotropic conductive film (ACF), hot bar soldering, paste soldering, or the surface mounted technology (SMT).

The above is only a preferred embodiment of the present disclosure, and is not intended to limit the scope of the present disclosure. Although embodiments of the present disclosure are described above, it is not intended to limit the present disclosure. The present disclosure may be modified or modified to equivalent variations without departing from the technical scope of the present disclosure by any person skilled in the art. Any simple modifications, equivalent changes and modifications made to the above embodiments remain within the scope of the technical solutions of the present disclosure.

What is claimed is:

1. A lens module comprising:
   a baseplate defining a receiving hole;
   an image sensor disposed on the baseplate and corresponding in position to the receiving hole;
   a mounting bracket disposed on the baseplate and defining a through hole, wherein an inner wall of the through hole extends towards a central axis of the through hole to form a platform, and a side of the mounting bracket adjacent to the platform extends outward to form a connecting portion;
   a multilayer coil surrounding the through hole, wherein the multilayer coil comprises a plurality of layers of encircling coils arranged on the mounting bracket from inside to outside;
   a capacitor arranged on the mounting bracket;
   a resistor arranged on the mounting bracket, wherein the multilayer coil, the capacitor, and the resistor are formed by laser direct structuring;
   an optical filter disposed on the platform and accommodated in the through hole;
   a lens disposed in the through hole; and
   a circuit board connected with the mounting bracket through the connecting portion.

2. The lens module of claim 1, wherein the number of layers in the multilayer coil is greater than 2, and the plurality of layers of encircling coils are conductive to each other.

3. The lens module of claim 1, wherein the receiving hole comprises a first receiving hole and a second receiving hole intercommunicating with the first receiving hole, a width of the first receiving hole is less than a width of the second receiving hole to form a flange, the image sensor is disposed on the flange.

4. The lens module of claim 3, wherein the width of the first receiving hole is less than a width of the image sensor, the width of the image sensor is less than or equal to the width of the second receiving hole, a depth of the second receiving hole is greater than or equal to a thickness of the image sensor, so that the image sensor is accommodated in the receiving hole.

5. The lens module of claim 1, further comprising a bonding pad disposed on a surface of the mounting bracket adjacent to the baseplate, wherein the bonding pad is connected with the baseplate.

6. The lens module of claim 1, wherein the capacitor is arranged on the inner wall of the through hole.

7. The lens module of claim 1, wherein the optical filter is an infrared filter.

8. The lens module of claim 1, further comprising a connector disposed on the circuit board.

9. A method for manufacturing a lens module, comprising:
   providing a baseplate, the baseplate defining a receiving hole;
   mounting an image sensor on the baseplate, the image sensor corresponding in position to the receiving hole;
   providing a mounting bracket, the mounting bracket defining a through hole, wherein an inner wall of the through hole extends towards a central axis of the through hole to form a platform, and a side of the mounting bracket adjacent to the platform extends outward to form a connecting portion;
   forming a multilayer coil, a capacitor, and a resistor on the mounting bracket by laser direct structuring, wherein the multilayer coil comprises a plurality of layers of encircling coils arranged on the mounting bracket from inside to outside;
   mounting an optical filter on the platform, the optical filter being accommodated in the through hole;
   mounting a lens in the through hole;
   mounting the mounting bracket on the baseplate; and connecting a circuit board with the mounting bracket through the connecting portion.

10. The method of claim 9, wherein the mounting bracket is formed by laser direct structuring.

11. The method of claim 9, wherein the number of layers in the multilayer coil is greater than 2, and the plurality of layers of encircling coils are conductive to each other.

12. The method of claim 9, wherein the receiving hole comprises a first receiving hole and a second receiving hole intercommunicating with the first receiving hole, a width of the first receiving hole is less than a width of the second receiving hole to form a flange, the image sensor is disposed on the flange.

13. The method of claim 12, wherein the width of the first receiving hole is less than a width of the image sensor, the width of the image sensor is less than or equal to the width of the second receiving hole, a depth of the second receiving hole is greater than or equal to a thickness of the image sensor, so that the image sensor is accommodated in the receiving hole.

14. The method of claim 9, further comprising forming a bonding pad on a surface of the mounting bracket adjacent to the baseplate, wherein the bonding pad is connected with the baseplate.

15. The method of claim 9, wherein the capacitor is arranged on the inner wall of the through hole.

16. The method of claim 9, further comprising forming a connector on the circuit board.

\* \* \* \* \*